United States Patent [19]

Blevins et al.

[11] Patent Number: 4,695,948
[45] Date of Patent: Sep. 22, 1987

[54] BUS TO BUS CONVERTER USING A RAM FOR MULTIPLE ADDRESS MAPPING

[75] Inventors: Ballard J. Blevins, Lexington, Ky.; William G. Kulpa, Austin, Tex.; Joseph R. Mathis, Georgetown, Tex.; John W. McCullough, Austin, Tex.

[73] Assignee: International Business Machines Corporation, Armonk, N.Y.

[21] Appl. No.: 706,734

[22] Filed: Feb. 28, 1985

[51] Int. Cl.⁴ ............................................ G06F 12/10
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,156,932 | 5/1979 | Robinson | 364/200 |
| 4,290,104 | 9/1981 | Holtey | 364/200 |
| 4,340,932 | 7/1982 | Bakula | 364/200 |
| 4,426,679 | 1/1984 | Yu | 364/200 |
| 4,437,157 | 3/1984 | Witalka | 364/200 |

Primary Examiner—Archie E. Williams, Jr.
Assistant Examiner—Florin Munteanu
Attorney, Agent, or Firm—Thomas E. Tyson; J. B. Kraft

[57] ABSTRACT

An improvement in a bus converter that provides a bus to bus address translation function permitting access from an I/O device connected on the I/O bus to a system bus and system memory, where the bus converter includes a circuit connected to the I/O bus to partition I/O addresses received from the I/O bus into a lower order field and a high order field and connected to a circuit to receive DMA ID's from the I/O bus to combine this DMA ID with the high order field to form a first combined address. The first combined address is input to a memory which provides corresponding control field and prefix field data. An address formatter is further included that is connected to receive the control field and prefix field data from the memory and further connected to receive the low order address field. The address formatter forms a second combined address from the prefix field, control field and lower order address field. This second combined address is then provided to a system bus to permit access to the system bus.

10 Claims, 4 Drawing Figures

BUS TO BUS CONVERTER USING A RAM FOR MULTIPLE ADDRESS MAPPING

BACKGROUND OF THE INVENTION

1. Field of the Invention

The present invention relates to data processing systems and particularly to systems having a system bus connected through a bus converter to an I/O bus, and more particularly to bus-to-bus translation apparatus.

2. Background Art

Many personal computers are provided with an I/O bus for the attachment of I/O adapters. The PC I/O bus, through control signals, may define two address maps, an I/O address map and a storage address map. Transactions over the PC I/O bus are assumed to be targeted for one of the two address maps, and provisions are not made in the PC I/O bus architecture to accommodate any address maps outside the domain of the I/O and storage maps. Direct Memory Access (DMA) transfers initiated by adapters on the PC I/O bus are required to access either the I/O bus attached storage or the system bus attached storage. Thus the I/O bus has effectively a dual storage address map, the basic I/O storage map and the reflected system storage map with no provisions for differentiation between the two maps. For a given address there may exist a machine configuration with an I/O adapter and system storage assigned to the same address within their respective address maps.

A bus converter may be interposed between a system bus and an I/O bus. Since the various I/O devices and the global system storage may have the same address difficulty may be encountered in transferring messages to a particular I/O device. The basic architectural assumptions that all data movement is confined within the address map or maps of the I/O bus makes no provision for accommodating a foreign address map outside the basic architecture.

The present invention solves the above problem by translating an address request to an address which maintains the address of the targeted storage location and in addition contains information identifying the specific I/O device.

The present invention pemits the migration of existing I/O bus architecture and associated adapters to a totally new environment not accounted for in the basic architecture.

SUMMARY OF THE INVENTION

It is an object of the present invention to permit the migration of an existing I/O architecture and adapters to a new system with multiple address maps.

It is another object of the invention to migrate an existing I/O bus architecture and associated adapters to a totally new environment not accounted for in the basic architecture.

It is another object of the present invention to provide a mechanism to insert control information on a message transfer originating on one bus that is targeted for a second bus.

It is still another object of the invention to provide a system that permits the coexistence of dual storage and I/O maps.

A further object of the invention is to provide a system that permits all storage addresses that are not implemented in I/O bus attached adapters to be mapped to the system bus.

A further object of the invention is to provide a system that permits storage addresses to be selectively mapped to the system bus with appropriate gating of I/O bus control signals and/or the inclusion of additional control information.

It is another object of the invention to provide for relocation of I/O addresses for presentation to the system bus.

Still another object of the invention is to provide access to both real and virtual address maps of the system bus.

Still a further object of the invention is to provide a system tolerant of changes in the configuration of the I/O adapters. The system allows the contents of a control word to be changed under program control at any point in the execution of a task and thus allows for a corresponding change in the nature of the modification of the I/O bus operation.

Still another object of the present invention is to provide a system where the flow, executing or effect of pending I/O bus operation can be modified without knowledge of, or cooperation by, the I/O device.

Still a further object of the invention is to provide isolation of I/O transfers in the access to system storage to prevent random access into a storage location not within the assigned domain of a given I/O adapter for a given transaction.

These and other objects of the present invention are provided by a programmable bus to bus translation apparatus which inserts control information on a message transfer originating on one bus that is targeted for a second bus. The bus to bus translation apparatus of the present invention can be made a component of a data processing system comprising a global system storage unit, a central processing unit, a system storage bus connecting the central processing unit and the global system storage unit, and a bus converter interfacing the system bus with an I/O bus. The I/O bus may be provided with a plurality of I/O ports to which randomly selected I/O devices are attached. In particular, the present invention is directed to means for partitioning I/O address fields which are transmitted to the I/O bus into a high order field and a low order field, and then combining the Direct Memory Access Identification (DMA ID) of the I/O devices with the high order field I/O address to form a combined address. The combined address is transmitted to a RAM which is programmed to reformat the combined address and to form a Translation Control Word (TCW) which has a control field and a prefix field. The TCW is transmitted to an address formatter. A second combined address is formed by combining the TCW and the low order field. The second combined address is then transmitted to the system bus.

In one preferred embodiment of the present invention the bus converter is provided with a logic circuit whereby access can be denied to certain addresses or particular I/O devices.

These and other objects, features and advantages of the invention will be apparent from the following, more particular description of the preferred embodiments of the invention as illustrated in the accompanying drawings.

DESCRIPTION OF THE PREFERRED EMBODIMENTS

The present invention is directed to an apparatus for use on a bus to bus translation. The apparatus of the present invention provides for the insertion of control information on a message transfer originating on an I/O bus that is targeted for a system bus. By using the apparatus of the present invention existing bus architecture and associated I/O adapters can be used.

The present invention permits attachment of existing I/O architecture and adapters to a Central Processor Unit (CPU) and associated system storage without requiring specific adaptation of the I/O devices, alteration of the CPU or its operating system. The apparatus used in a bus to bus translator of the present invention provides for dynamically translating the signals of the I/O bus to new addresses on the system bus which map onto unused segments of the system storage map.

The apparatus of the present invention is tolerant of changes in the configuration of the I/O adapters and allows for the flow or execution of the pending I/O bus operations without knowledge, or cooperation by the I/O device.

The TCW of the present invention contains both an address prefix and control information. The TCW allows for flexibility with respect to the I/O bus operation, and can effect no modification with respect to the I/O operation, provides a translation of the address as applied to the I/O bus for use on a system bus, can augment the I/O bus control information to permit access to the system bus in either real or virtual addressing mode, prevents access to the system bus for a given address or range of addresses, and/or causes a busy or bus error response to a selected I/O operation. The contents of the TCW can be changed under program control at any point in the execution of a task causing a corresponding change in the nature of the modification of the I/O bus operation.

Figure 1:
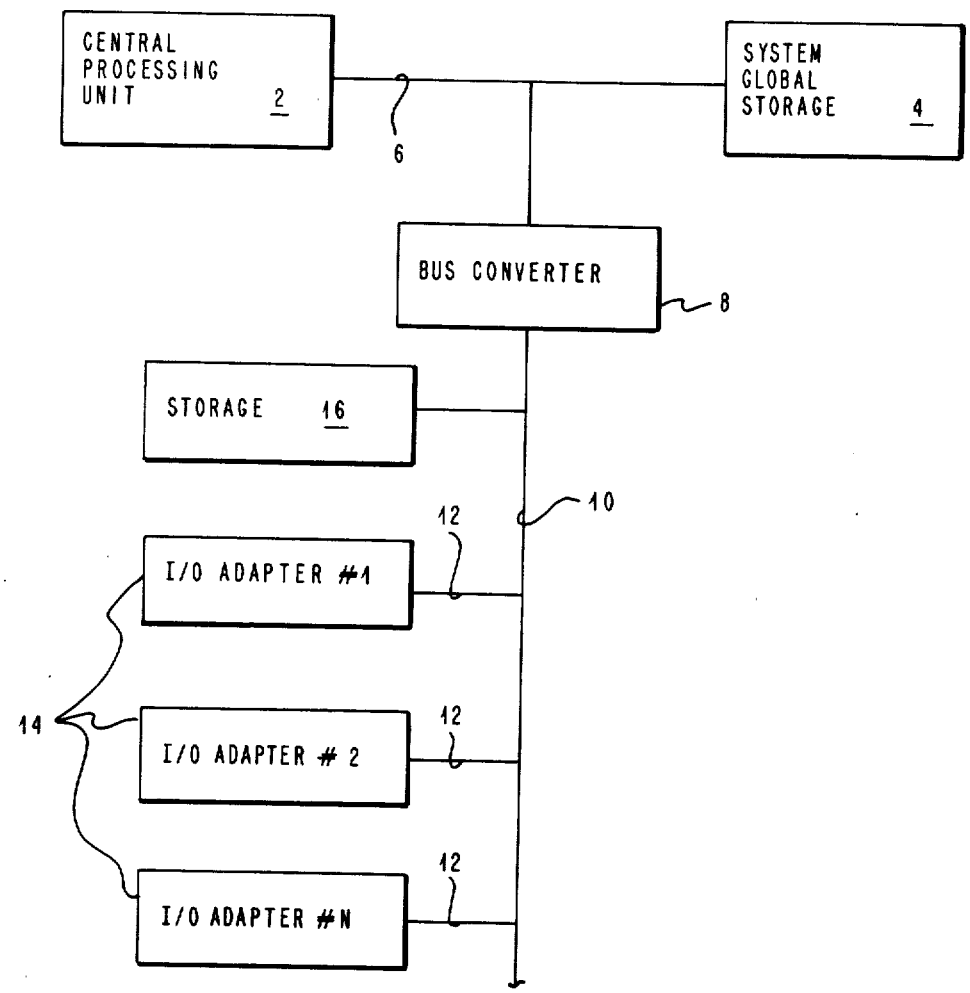
FIG. 1 is a schematic representation of a system utilizing the improvement of the present invention.

FIG. 1 shows a schematic representation of a system configuration which provides bus to bus translation. A central processing unit 2 and the system global storage 4 are connected by means of a system bus 6. Attached to the system bus 6 is a bus converter 8. Attached to the bus converter 8 is an I/O bus 10. A variety of I/O devices can be attached to ports 12 on the I/O bus 10 through I/O adapters 14. Storage 16 can also be attached to the I/O bus 10. The bus converter 8 is programmable and translates signals from the I/O bus 10. The bus converter can support real, real resolved and virtual storage access.

Figure 2:
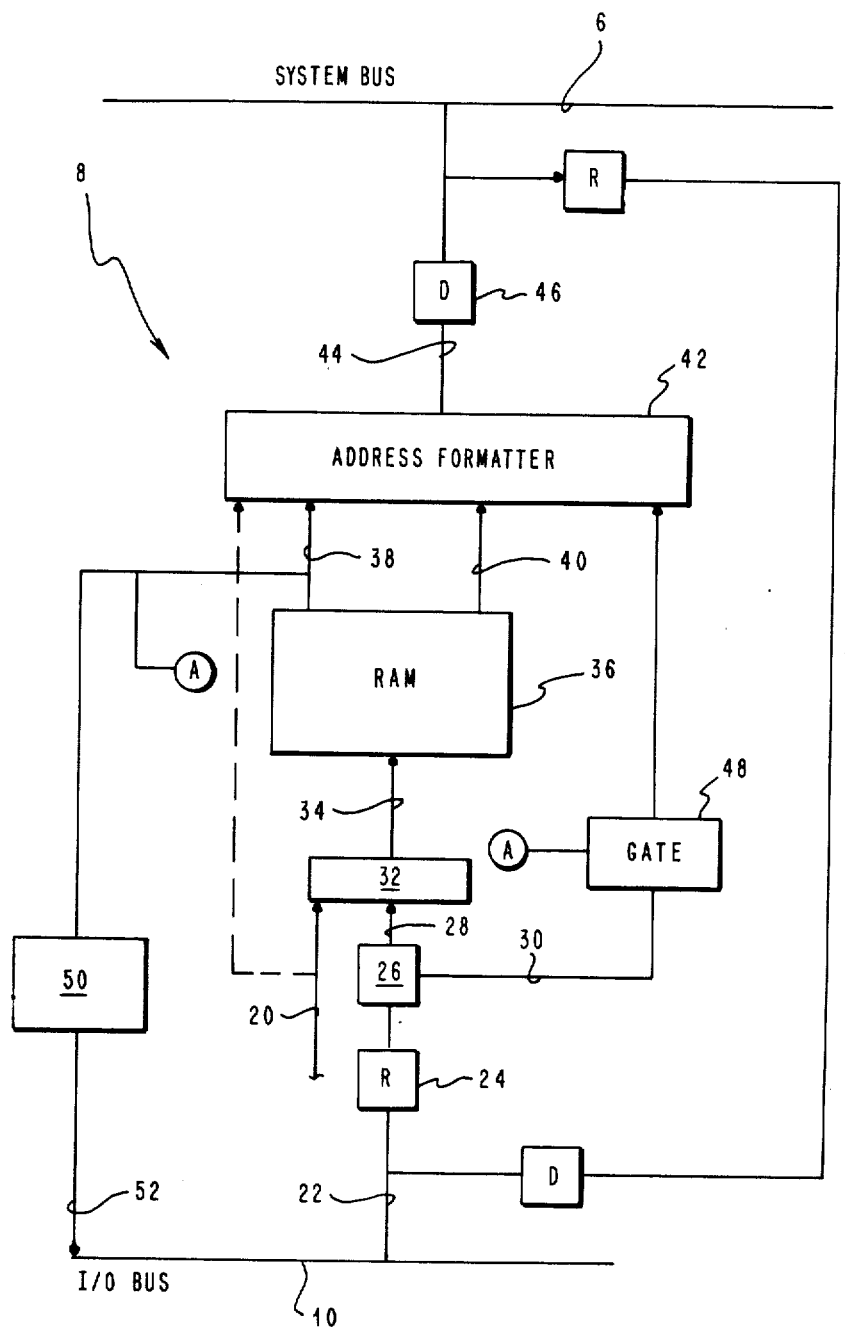
FIG. 2 is a schematic representation of one embodiment of the bus converter of the present invention.

FIG. 2 is a schematic representation of one embodiment of the bus converter 8 of the present invention. The I/O bus 10 carries direct memory access identification 20 signals (DMA ID), storage addresses 22 of the storage of the I/O devices, as well as the stored data. The addresses pass through receiver 24. and next pass through means for partitioning each I/O address 22 into a high order field 28 and a low order field 30. Means 32 are provided for combining the DMA ID 20 and the high order field 28 to form a first combined address 34. A RAM 36 provides a table of programmable entries that instruct the logic in the bus converter 8 on the required action to be taken on each I/O bus cycle. The RAM 36 is programmed to reformat to first combined address 34 into a control field 38 and a prefix field 40. The control field 38 and the prefix field 40 form the TCW.

Figure 3:
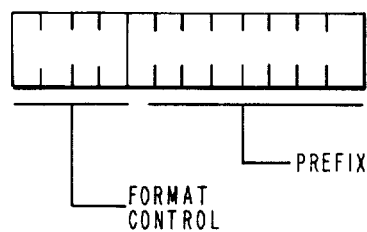
FIG. 3 is a schematic representation of a format for a translation control word.

FIG. 3 is a schematic representation the format of a TCW. The format contains a format control and a prefix. Part of the format control information identifies the target storage unit. If maps with duplicate addresses are used the format control contains the necessary information to select which map to address. Other portions of the format control are used to control the formatting of the address by the bus converter. The prefix contains the information necessary to identify the address within the target storage area.

Again referring to FIG. 2 an address formatter 42 receives the control field 38, the prefix field 40 and the lower order address field 30 and operates on the prefix field 40 and the lower order address field 30 to form a second combined address 44 which is transmitted to the system bus 6 through the bus driver 46. This combined address 44 directs the data from the I/O bus 10 to a unique region within the global storage system.

Additional variations in the translation ability of the bus converter 8 can be accomplished by including a gate 48 through which the lower order field 30 passes. The gate 48 is responsive to the control field 38 and limits the bits transferred from the lower order field 30 to the address formatter 42.

The control field 38 can be input to means 50 for generating bus control signals. Means 50 sends control signals 52 back to the I/O bus 10 to control the I/O devices. This can result in denial of access to a selected address block of an I/O device.

In another preferred embodiment of the DMA IDs are input into the address formatter 42 with the control field 38, the prefix field 40, and the lower order field 30. The address formatter 42 operates on the prefix field 40 and the lower order field 30 responsive to the DMA ID 20 and the control field 38 to produce a combined address which the bus driver 46 transmits to the system bus 6.

In another preferred embodiment the RAM 36 is programmed to generate a control field 38 for certain DMA ID's 20 which will block the address formatter 42 from generating a combined address and thus deny access to the system global storage map 4.

Figure 4:
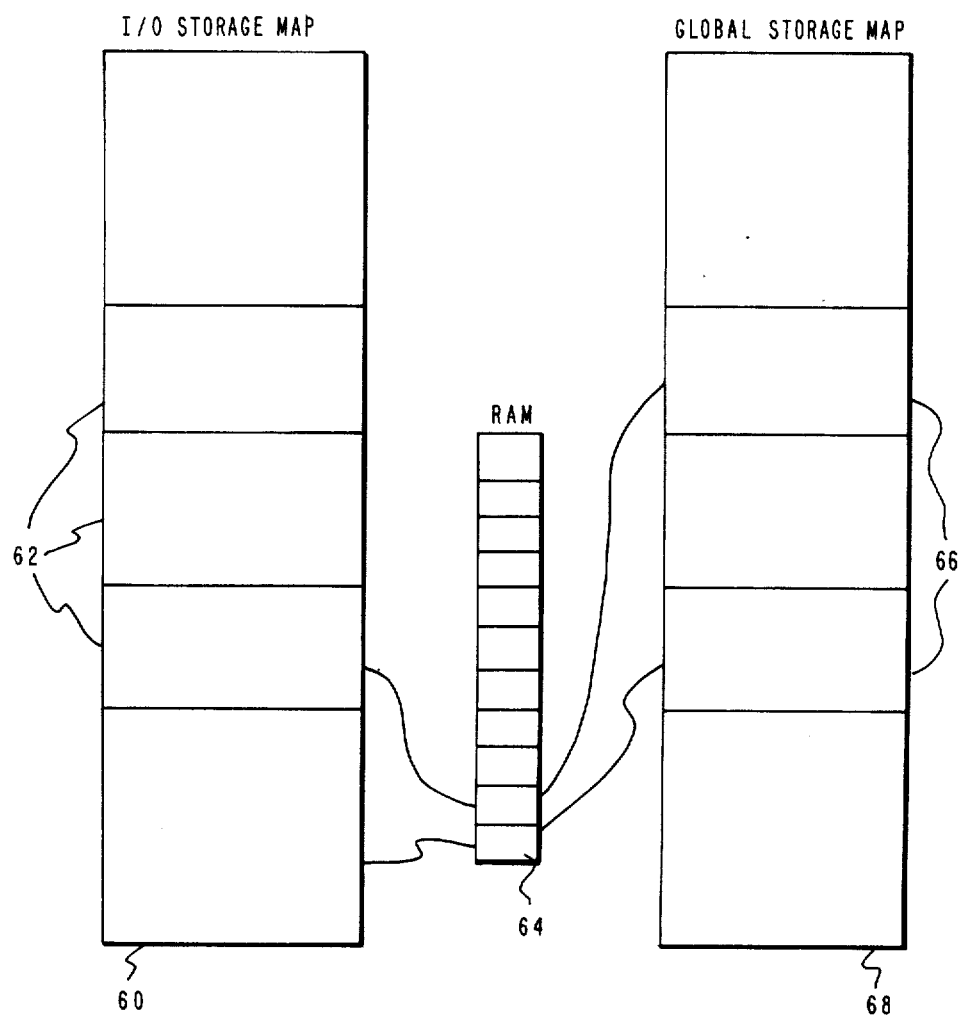
FIG. 4 is a schematic representation of the mapping of the I/O storage onto the system global storage.

FIG. 4 is a schematic representation of the mapping of the I/O storage onto the system global storage. The I/O storage is partitioned into blocks 62. For each block there is an associated RAM element 64. Each RAM element 64 contains a control code and a prefix. The control code and prefix point to blocks 66 in the global storage map 68. The local address in each of the blocks is determined by the lower order address bits forming the lower order field 30.

While the novel features of this invention have particular applications, it will be appreciated that various omissions and substitutions in form may be made by those skilled in the art without departing from the spirit of the invention.

What is claimed is:

1. An improved data processing system comprising a global system storage unit, a central processing unit, a system bus connecting the central processing unit and the global system storage unit, a bus converter interfacing the system bus with an I/O bus, said I/O bus having a plurality of I/O ports, and means for connecting a plurality of randomly selected I/O devices respectively to said I/O ports and having one such I/O device so connected, the improvement in the bus converter comprising:

means connected to said I/O bus for partitioning I/O address fields which are transmitted from said I/O bus into a high order field and a low order field;

means connected to receive a DMA ID of said connected I/O device from said I/O bus and for combining the DMA ID of said I/O device with the high order field of said I/O address to form a first combined address;

means for accessing a RAM with said first combined address to obtain data containing a control field and a prefix field and outputting the same;

an address formatter connected to receive said control field, said prefix field and said low order address field and for providing a second combined address from said prefix field, said lower order field and said control field; and means connected to said address formatter for transmitting said second combined address onto said system bus.

2. The improved data processing system of claim 1 further comprising:

a gate connected to said partitioning means through which said lower order field or part thereof passes; and means connected to said accessing means for selectively gating a portion of said lower order field to said address formatter in response to control field data.

3. The improved data processing system of claim 2 further comprising:

means for generating bus control signals to said I/O bus responsive to said control field.

4. The improved data processing system of claim 3 wherein said address formatter receives said DMA ID of said I/O device and forms said second combined address from said prefix field and said lower order field in accordance with said control field and said DMA ID.

5. The improved data processing system of claim 3 wherein one of said control signals to said I/O bus indicates a denial of access to said system bus.

6. The improved data processing system of claim 4 wherein said said address formatter selectively blocks generation of said second combined address in response to said control field and said DMA ID.

7. In a data processing system including a central processing unit connected to a system memory by a system bus, said system further including a bus converter connected between the system bus and an I/O bus, said I/O bus connected to at least one I/O device and providing I/O data, address and DMA ID information from said connected I/O devices to said bus converter, an improvement in said bus converter comprising:

means for receiving an I/O address and DMA ID from said I/O bus and partitioning said I/O address into a low order address and a high order address;

means connected to said partitioning means for combining said high order address and said DMA ID to form a first combined address;

memory means connected to receive said first combined address and provide data including a prefix field and a control field in response thereto;

address formatter means for receiving said low order address from said receiving means and said prefix and control fields from said memory means for providing a second combined address in response thereto; and means for providing said second combined address to said system bus.

8. The data processing system according to claim 7 wherein said memory means is programmable from said central processing unit through said system bus to provide predetermined prefix and control fields in response to the first combined addresses.

9. The data processing system according to claim 8 wherein said bus converter further includes gating means connected between said receiving means and said address formatter means and connected to said memory means for selectively gating said low order address in response to said control field 10. The data processing system according to claim 9 wherein said bus converter further includes control means connected to said I/O bus and said memory means for selectively proving control signals to said I/O bus in response to control field data.

* * * * *